April 9, 1963  G. K. HAUSE  3,084,569
MULTIPLE SPEED SPLIT TORQUE TRANSMISSION
Filed July 24, 1961
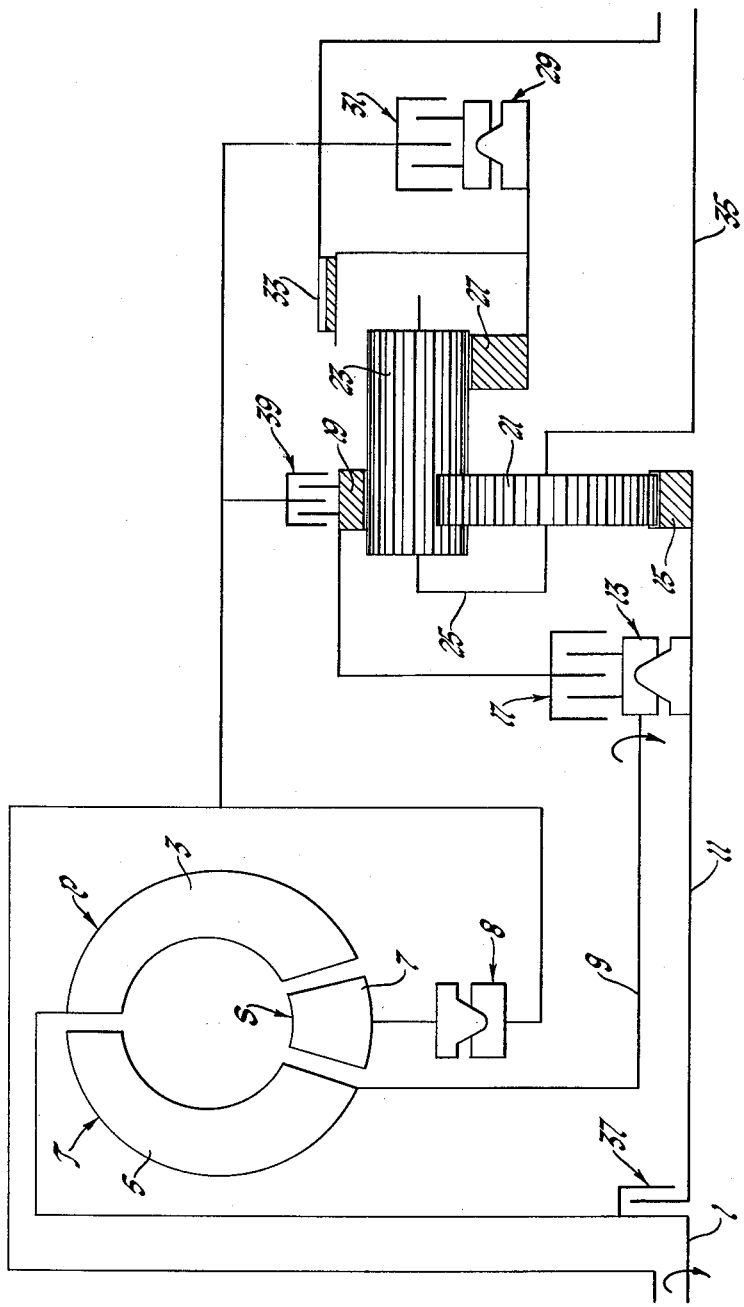
INVENTOR.
Gilbert K. Hause
BY
Robert B. Gerhardt
ATTORNEY

United States Patent Office 3,084,569
Patented Apr. 9, 1963

3,084,569
MULTIPLE SPEED SPLIT TORQUE
TRANSMISSION
Gilbert K. Hause, Bloomfield Hills, Mich., assignor to General Motors Corporation, Detroit, Mich., a corporation of Delaware
Filed July 24, 1961, Ser. No. 126,293
6 Claims. (Cl. 74—688)

This invention relates to motor vehicle transmissions and more particularly to automatic transmissions providing a plurality of speed reduction ratios.

In order that a motor vehicle transmission can provide the relatively large torque ratio range of operation required with some engines it is desirable that the transmission have at least three speed ratios in combination with the variable torque multiplication obtained from a hydraulic torque converter. Also in order to provide for increased overall efficiency and sufficient engine braking during vehicle coasting, it is also desirable that the transmission employ a combined mechanical and fluid torque drive in the highest gear ratio in which the transmission normally operates. These desired characteristics should be attained with a minimum number of parts in the transmission in order to reduce the cost, size, and weight of the same.

It is therefore an object of this invention to provide a combined torque converter and gearing transmission which will provide three gear ratios from a single planetary gear set.

It is a further object to provide a three speed torque converter transmission that employs a combined mechanical and fluid drive in the highest gear ratio.

These and other objects and advantages will be readily apparent from the following description and accompanying drawing which schematically illustrates a representative member of the invention.

Referring to the FIGURE 1 represents the transmission input shaft which is adapted to be connected to the vehicle engine. Shaft 1 is connected to drive a conventional torque converter impeller or pump wheel, generally designated P, and represented in the figure by the vane 3. Impeller P operates to circulate working fluid in a closed toroidal path in known manner. Oil circulated by the impeller drives a turbine member, generally designated T, and represented in the figure by vane 5. The torque converter also includes a reaction stator, generally designated S, and represented by vane 7, and which is connected through a one way device, represented in the figure by the ratchet or free wheel device 8, to a stationary portion of the transmission. The turbine T is connected to drive an intermediate sleeve shaft 9 which in turn is connected through a second one way device, represented by the ratchet device 13, to an intermediate shaft 11 in turn connected to a sun gear 15.

The sun gear 15 forms one input gear member of a planetary gear unit which also includes one or more pairs of planet pinions 21 and 23 journalled on a common carrier 25. The planet pinion 21 in addition to meshing with the pinion 23 meshes with the input sun gear 15. The gear unit also includes a second sun gear 27 meshing with planet pinion 23. The sun gear 27 can be held against reverse rotation by application of a multiple disc friction member, generally designated 31, which acts through a one way device, shown as a ratchet device 29, to prevent such reverse rotation. A brake band element 33 can also be applied to prevent rotation of the sun gear 27 in either direction.

The planetary gear unit further includes a ring gear 19 that meshes with planet pinion 23. The ring gear 19 constitutes a second input member of the gear unit and can be connected through a multiple disc friction clutch, generally designated 17, to the intermediate shaft 9 and hence the turbine T. The ring gear 19 can be held against rotation in either direction by a multiple disc friction brake, generally designated 39, and which provides positive torque reaction for the gear unit in both directions of drive and as explained below provides reverse drive reaction.

The planet carrier 25, on which the planet pinions 21 and 23 are mounted, is connected to a transmission output shaft 35 that is adapted to be connected through a differential, not shown, to the vehicle wheels for drive thereof. The sun gear 15 can be connected by a friction clutch, generally designated 37 and sometimes hereinafter referred to as the split torque clutch, directly to the transmission input shaft 1.

In order to establish low speed forward drive in the transmission the friction device 31 is engaged. This prevents reverse rotation of the reaction sun gear 27. The various drive control and establishing elements of the transmission such as the friction members 17, 31, 33, 37 and 39 can be actuated by any suitable means such as fluid servos which in turn can be controlled by any suitable manual or automatic control means. The clutches 17 and 37 are disengaged in low drive as are the brake members 33 and 39. Rotation of the turbine T by the fluid in the hydraulic torque converter at a torque that is multiplied by the vanes of the stator S functioning in a normal hydrodynamic manner, causes drive of the sleeve shaft 9 in a forward or clockwise direction as viewed from the left in the drawing. This forward drive is transmitted through the one way device 13 to the shaft 11 and sun gear 15 causing rotation of this sun gear in a forward or clockwise direction. Forward rotation of the sun gear 15 causes the planet pinion 21 to rotate on the carrier 25 and to cause rotation of the planet pinion 23. Rotation of the planet pinion 23 is limited by the stationary reaction sun gear 27 and the carrier 25 is caused to rotate around in a forward or clockwise direction at a reduced speed.

As an example, if the ring gear 19 has 71 teeth, the sun gear 15 has 27 teeth, and the sun gear 27 has 39 teeth, the reduction ratio between the shaft 11 and the output shaft 35 in low drive will be 2.44 to 1. This geared ratio is of course further multiplied during start by the torque converter stall ratio. As the vehicle picks up speed and the turbine T rotates faster, the torque multiplication of the converter decreases in known manner until it operates as a fluid coupling.

To establish second or intermediate speed drive, the clutch 17 is engaged to connect the turbine shaft 9 with the input ring gear 19. The other friction elements, 31, 33, 37 and 39 remain in the same condition as in the starting or low drive condition. With the sun gear 27 still held against reverse rotation by the free wheel device 29 and brake 31, rotation of the ring gear 19 causes the carrier 25 to rotate around in a forward direction at a reduced rate, but faster than that obtained in low drive. The pinion 21 is driven by the pinion 23 to drive sun gear 15 in a forward direction and at a speed greater than that of the ring gear 19. The one way device 13 permits the sun gear 15 and shaft 11 to run faster than the shaft 9 and ring gear 19. Under the illustrative gear teeth example given above, where the ring gear 19 has 71 teeth and the sun gear 27 has 39 teeth, the reduction ratio between the ring gear 19 and the output shaft 35 will be 1.55 to 1 in second speed.

To establish high or split torque drive, the split torque clutch 37 is applied so that the shaft 11 and sun gear 15 are driven directly by the input shaft 1. Since at this time the torque converter will usually have gone into a fluid coupling phase of operation, the sun gear 15 will be driven only slightly faster than the ring gear 19 is driven by the shaft 9 through clutch 17. This causes the complete gear set to rotate as a unit to drive the carrier 25 and connected output shaft at a speed just slightly less than engine speed. The mechanical torque path including sun gear 15, shaft 11 and clutch 37 provides for efficient and direct torque transmission. The hydraulic torque path including ring gear 19, clutch 17, shaft 9 and the torque converter provides smooth, vibration absorbing, drive with instantaneous and infinitely variable torque multiplication available upon increases in speed of the engine or additional load on the output shaft.

Reverse drive in the transmission is obtained by engaging the reverse brake 39 to hold the ring gear 19 against rotation. The other friction members 17, 31, 33 and 37 are disengaged. The drive is then from the turbine T, the shaft 9 and through the one way device 13 to the sun gear 15. This causes rotation of pinions 21 and 23. Since pinion 23 meshes with the stationary ring gear 19, the pinion 23 will walk around inside the ring gear 19 in a reverse direction carrying the carrier 25 and output shaft 35 therewith. With the gear tooth specifications given above there is a reduction of 1.92 to 1 in reverse drive.

When it is desired to utilize the vehicle engine as a brake as when coasting down an incline, the band 33 is applied to hold the reaction sun gear 27 from rotation in either direction. This allows transmission of torque from the output shaft 35 through the gearing to the turbine shaft 9 which drives the turbine T so that it performs as an impeller to drive the normal impeller P and connected engine. The turbine is overdriven by the gearing at a ratio dependent on whether or not clutch 17 is engaged. If clutch 17 is engaged the overdrive ratio is the reciprocal of the ratio in intermediate or second speed, i.e. 1 to 1.55. If the clutch 17 is not engaged this ratio is the reciprocal of the low speed forward drive ratio or 1 to 2.44.

It is to be understood that changes and modifications may be made without departing from the spirit of the invention which is limited by the following claims.

I claim:

1. A transmission for a motor vehicle including an input shaft and an output shaft, a fluid torque transmitting device having an input member connected to be driven by said input shaft, a planetary gear unit including a pair of input gear members, a reaction gear member and an output member, one way drive means for connecting one of said input members to said fluid torque transmitting device for drive thereby, releasable clutch means for connecting the other of said input members to said fluid torque transmitting device for drive thereby, releasable brake means for holding said reaction member to establish reduction drive in said gear unit when either of said input members are driven, additional clutch means for connecting said one input member to said input shaft for simultaneous split torque drive of said gear unit by both of said input gear members, and means connecting said output member to said output shaft.

2. A transmission for a motor vehicle including an input shaft and an output shaft, a fluid torque transmitting device having an input member connected to be driven by said input shaft, a planetary gear unit including a pair of input gear members, a reaction gear member and an output member, one way drive means for connecting one of said input members to said fluid torque transmitting device for drive thereby, releasable clutch means for connecting the other of said input members to said fluid torque transmitting device for drive thereby, releasable brake means for holding said reaction member to establish forward drive reaction in said gear unit when either of said input members are driven, additional clutch means for connecting said one input member to said input shaft for simultaneous split torque drive of said gear unit by both of said input gear members, means connecting said output member to said output shaft, and releasable means for holding said other input member to provide reverse drive reaction in said gear unit.

3. A transmission for a motor vehicle including an input shaft and an output shaft, a fluid torque transmitting device having an input member connected to said input shaft, a planetary gear unit including a sun gear input member and a ring gear input member, a reaction sun gear member and an output carrier member, one way drive means for connecting said input sun gear member to said fluid torque transmitting device for drive thereby, reelasable clutch means for connecting said ring gear input gear member to said fluid torque transmitting device for drive thereby, releasable brake means for holding said reaction sun gear member to establish reduction drive in said gear unit when either of said input members are driven, releasable means for connecting said sun gear input member to said input shaft for simultaneous split torque drive of said gear unit by both of said input members, and means connecting said carrier member to said output shaft.

4. A transmission for a motor vehicle including an input shaft and an output shaft, a fluid torque transmitting device having an input member connected to said input shaft, a planetary gear unit including a pair of meshing planet pinions rotatably mounted on a common carrier, a pair of sun gears each meshing with one of said planet pinions and a ring gear meshing with one of said pinions, first releasable means for connecting one of said sun gears to said fluid torque transmitting device for drive thereby, second releasable means for connecting said ring gear to said fluid torque transmitting device for drive thereby, third releasable means for holding said other sun gear against rotation in at least one direction to establish reduction drive in said gear unit when either said one sun gear or said ring gear is driven, releasable means for connecting said one sun gear to said input shaft for simultaneous split torque drive of said gear unit by both of said one sun gear and said ring gear, and means connecting said carrier to said output shaft.

5. A transmission for a motor vehicle including an input shaft and an output shaft, a fluid torque transmitting device having an input member connected to said input shaft, a planetary gear unit inculding a pair of meshing planet pinions rotatably mounted on a common carrier, a pair of sun gears each meshing with one of said planet pinions and a ring gear meshing with one of said pinions, first releasable means for connecting one of said sun gears to said fluid torque transmitting device for drive thereby, second releasable means for connecting said ring gear to said fluid torque transmitting device for drive thereby, third releasable means for holding said other sun gear against rotation in at least one direction to provide forward drive reaction in said gear unit when either said one gear or said ring gear is driven, releasable means for connecting said one sun gear to said input shaft for simultaneous split torque drive of said gear unit by said one sun gear and said ring gear, means connecting said carrier to said output shaft, and releasable means for holding said ring gear against rotation to provide reverse drive reaction in said gearing.

6. A transmission for a motor vehicle including an input shaft and an output shaft, a hydraulic torque converter device having an input impeller member connected to said input shaft and an output turbine member, a gear unit including a pair of input members, a reaction member and an output member, first releasable means including a one way device for connecting one of said input members to said turbine member for drive thereby, second releasable means for connecting the other of said input members to said turbine member to drive thereby, third releasable means for holding said reaction member against reverse rotation to establish speed reduction drive in said gear unit when either of said input members are driven, fourth releasable means for connecting one of said input members to said input shaft for simultaneous split torque drive of said gear unit by said second and said fourth releasable means, and means connecting said output member to said output shaft.

References Cited in the file of this patent
UNITED STATES PATENTS

| | | |
|---|---|---|
| 2,890,601 | Forster | June 16, 1959 |
| 2,901,923 | Waclawek | Sept. 1, 1959 |